United States Patent [19]

Larsen

[11] Patent Number: 5,402,058
[45] Date of Patent: Mar. 28, 1995

[54] METHOD AND APPARATUS FOR CONTROLLING DISCHARGE OF A THYRISTOR-SWITCHED CAPACITOR

[75] Inventor: Einar V. Larsen, Charlton, N.Y.

[73] Assignee: General Electric Co., Schenectady, N.Y.

[21] Appl. No.: 987,688

[22] Filed: Dec. 9, 1992

[51] Int. Cl.6 .............................. G05F 1/70; H02J 3/18
[52] U.S. Cl. ..................................... 323/211; 323/210
[58] Field of Search ............... 323/208, 209, 210, 211; 363/54, 56, 68; 361/91, 111

[56] References Cited

U.S. PATENT DOCUMENTS

| | | | |
|---|---|---|---|
| 4,472,674 | 9/1984 | Yano et al. | 323/210 |
| 4,475,139 | 10/1984 | Chadwick | 361/91 |
| 4,567,424 | 1/1986 | Dobsa et al. | 323/210 |
| 4,571,535 | 2/1986 | Gyugyi | 323/211 |
| 4,636,910 | 1/1987 | Chadwick | 361/103 |
| 4,719,402 | 1/1988 | Brennen et al. | 323/211 |
| 5,093,630 | 3/1992 | Sato | 323/210 |

Primary Examiner—Steven L. Stephan
Assistant Examiner—Shawn Riley
Attorney, Agent, or Firm—Nixon & Vanderhye

[57] ABSTRACT

A static VAR compensator (11) is connected across a power transmission line (10) and includes a capacitor (12) connected to transmission line (10). The static VAR compensator (11) includes a capacitor (12) connected to the AC transmission line (10) and thyristor switches (18, 22) for controllably switching the capacitor (12) across the transmission line (10). The thyristors (18, 22) are fired based on signals generated by control circuitry (26, 28, 30). A substantially constant or DC voltage exists across the capacitor (12) after the thyristor switches have been turned-off. Discharge control circuitry (30) generates firing pulses to activate the thyristor switches (18, 22) in order to discharge the capacitor (12) and reduce the voltage across the capacitor (12) to zero. In one embodiment, the capacitor (12) is discharged gradually using a series of discharge pulses. In another embodiment, the capacitor (12) is rapidly discharged by gating the thyristor (16) for a period sufficient to accomplish complete discharge. The capacitor (12) and thyristor switches (18, 22) may be shunted by nonlinear clamping devices (26, 28), and a potential transformer (52) and resistor (50) may be connected in shunt across capacitor (12).

26 Claims, 6 Drawing Sheets

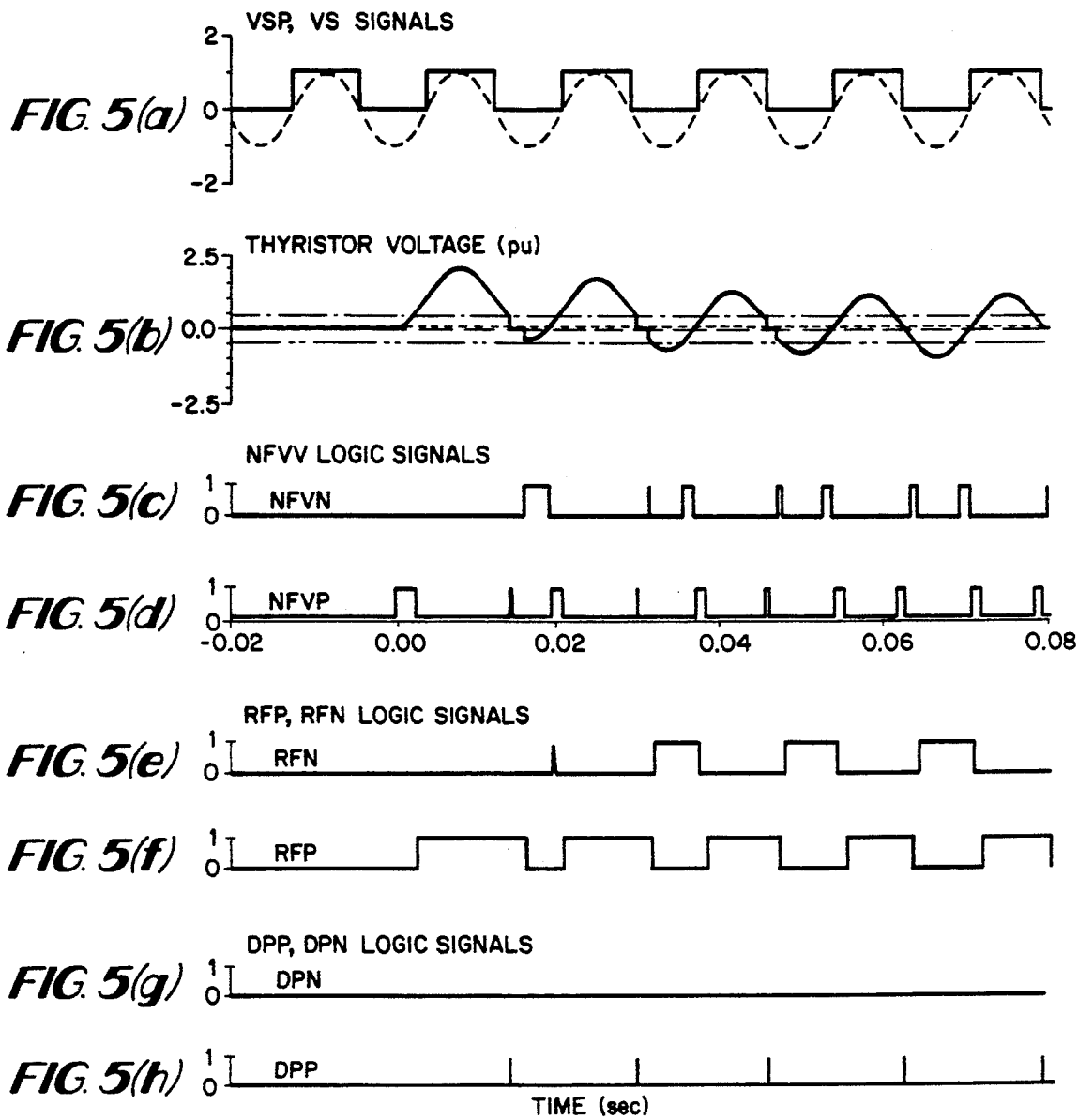

METHOD AND APPARATUS FOR CONTROLLING DISCHARGE OF A THYRISTOR-SWITCHED CAPACITOR

TECHNICAL FIELD

The present invention relates generally to static VAR compensators employing thyristor-switched capacitors, and more specifically, to a control system for discharging thyristor-switched capacitors.

BACKGROUND

Early reactive power compensators used a thyristor-controlled inductor and a fixed or mechanically switched capacitor network to provide power factor correction for industrial loads. Later VAR generators were designed using thyristor-switched capacitors along with thyristor-controlled inductors, e.g., see U.S. Pat. No. 4,472,674 entitled "Method of Static Reactive Power Compensation" and U.S. Pat. No. 4,719,402 entitled "VAR Compensator System With Minimal Standby Losses."

A thyristor-switched capacitive (TSC) network indicated generally at 11 is shown in FIG. 1. Voltage $V_S$ from an AC electrical power supply network (not shown) is supplied over an AC transmission line 10. The thyristor-switched capacitive network 11 is connected to the transmission line 10, e.g. across one phase of the AC power supply network, and includes a capacitor 12 connected at one terminal to the AC transmission line 10 and at the other terminal to a surge inductor 14. Surge inductor 14 is also connected to thyristor switch 16 having antiparallel thyristors 18 and 22 which are controlled by externally generated firing signals 20 and 24, respectively.

Capacitor voltage $V_C$, thyristor voltage $V_T$, and thyristor current $I_T$ waveforms which illustrate operation of TSC network 11 are shown in FIG. 2 in normalized, per-unit (p.u.) values. Thyristor switches 18 and 22 are normally fired to conduct current in response to a VAR demand signal when the capacitor voltage $V_C$ and the AC network voltage $V_S$ (waveform not shown) are equal, i.e. when the voltage $V_T$ across the thyristor switches 18 and 22 is zero. The waveform shows that before time ($-0.02$) seconds, thyristor 16 is switched on, thyristor current $I_T$ flows, and the thyristor voltage $V_T$ equals zero. The thyristor current $I_T$ leads the capacitor voltage $V_C$ by ninety degrees. At time (0.00) seconds, the reactive power demand is removed turning off the thyristor causing $I_T$ to become zero. At this instant in time, the capacitor voltage $V_C$ is equal to the negative peak of the AC network voltage $V_S$ normalized to a value of $-1.0$ p.u. Typical absolute values of $V_S$ would be in the range of 5,000 to 50,000 volts. Since the thyristor 16 is disconnected and no current flows, the capacitor 12 remains charged to that voltage $V_C$.

The voltage across thyristor switch 16 $V_T$ is the difference between the applied AC system voltage $V_S$ and the essentially DC capacitor voltage $V_C$. This difference ($V_T$) reaches a maximum value of twice the peak AC voltage, i.e. 2.0 p.u. once each cycle. Thus, the thyristor switch 16 must be rated to block this maximum value voltage. In addition, the AC network voltage $V_S$ may transiently increase considerably above its peak values to excessively high voltage levels. Should the capacitor 12 be disconnected at these higher voltage levels, both the capacitor 12 and thyristors 18 and 22 would be subjected to more than twice the peak AC voltage. Accordingly, both components must be designed and constructed with adequate insulation, etc. for those voltage levels adding considerable expense to component and system costs.

One partial solution is to connect a voltage limiting device such as a metal oxide varistor (MOV) across the capacitor 12, shown as varistor 23, and across the surge inductor 14 and thyristor switch 16, shown as varistor 25. Varistors have a high resistance at voltages below a predetermined value and a relatively low resistance at voltages above a predetermined value, and as a result, they protect against transient high voltage peaks. Exemplary protective circuits using MOVs are taught in U.S. Pat. No. 4,475,139 entitled "Thyristor-switched Capacitor Apparatus" and U.S. Pat. No. 4,636,910 entitled "Varistor Over Voltage Protection System With Temperature Systems." However, these systems using MOV devices still suffer from the serious drawback that the capacitor is charged to a voltage which causes the thyristor switch to see two times the normal peak voltage of the system.

Other over voltage protection systems inhibit disconnection of the capacitor 12 under high AC network voltage conditions by keeping the thyristor switch conducting. The drawback with this approach is that the connected capacitor increases the already high network voltage and may also create a dangerous oscillatory condition in the AC network which could further aggravate overvoltage problems. Thus, the voltage rating of the thyristor switch 16 must again be increased.

U.S. Pat. No. 4,571,535 entitled "VAR compensator Having Control Discharge Of thyristor-switched Capacitors" discloses a capacitor connected in series with two "half" thyristor switches where each half switch includes back-to-back thyristor switch pairs. Connected across each half-switch is a nonlinear clamping device, e.g. an MOV. When the thyristor switch is turned off, one of the two thyristor half-switches is kept on to effectively shunt its associated MOV so that the varistor for the off half-switch discharges the capacitor to a level determined by the breakdown voltage of the varistor connected across the nonconducting half-switch. The MOV in parallel with the nonconducting half-switch conducts the capacitor discharge current as long as the voltage exceeds its breakdown voltage with the conducting half-switch shunting the discharge current. The voltage across the capacitor is limited to a value approximately equal to that of the sum of the breakdown voltages of the MOV's. While the system of the '535 patent offers some improvement, it still suffers drawbacks. First, additional hardware including at least four thyristors and two MOV devices is required. Second, discharge of the capacitor is performed crudely and is dependent on the breakdown voltage of the MOV devices. Third, there is no mechanism for controlling the rate of capacitor discharge to minimize stress on TSC components.

Thus, the prior art is deficient in that it does not provide any mechanism for discharging the capacitor in a flexible and cost efficient manner so as to minimize the maximum voltage across the thyristor without requiring additional switching and clamping devices. It would be desirable to limit the voltage across the thyristor by completely discharging the capacitor so that the voltage across the thyristor is simply the source voltage. Moreover, it would be beneficial to perform that discharging in a flexible and controlled manner to permit both rapid and gradual rates of capacitor discharge depending upon system design objectives.

SUMMARY OF THE INVENTION

The present invention relates to a method and apparatus for discharging a static VAR compensator in an AC electrical system including a capacitor connected in series between the AC electrical system and two antiparallel thyristor switches which are selectively controlled by external control signals. The method includes determining whether the magnitude of voltage across the thyristor switches exceeds a predetermined voltage threshold when the thyristor is turned off, and firing one or more of the thyristor switches to discharge the capacitor until the capacitor is discharged. In one embodiment, a single control pulse is applied to fire the thyristor switches for a time period sufficient to substantially and fully discharge the capacitor. In another embodiment, a periodic series of firing pulses are applied to one of the thyristor switches to gradually discharge the capacitor thereby relieving stress on the capacitor and thyristors. Both discharge techniques permit lower voltage ratings for the static VAR component which reduces component and system costs.

The present invention further relates to a system for discharging a static VAR compensator. A power transmission line provides AC power. A capacitor is connected to the transmission line and to switching means for controllably switching the capacitor across the transmission line. A control means activates the switch means when a substantially constant voltage exists across the capacitor to reduce the capacitor voltage to zero. In one embodiment, the control means periodically activates the switching means to gradually reduce the capacitor voltage to zero over a number of cycles. In another embodiment, the control means activates the switching means during a single time period sufficient to rapidly and fully discharge the capacitor.

A resistor and a potential transformer may be connected in shunt across the capacitor to controllably dissipate capacitor discharge currents. The resistor delays the decay characteristic of the discharge current, dissipates energy extracted from the capacitor away from the potential transformer, and limits current when the thyristor is switched on. In addition, a surge inductor may be connected between the capacitor and the thyristor switches to limit the rate of change of current to a level tolerable for the thyristors. The capacitor and thyristor switches may be shunted by nonlinear clamping devices which exhibit high resistance below a specified voltage and low resistance above that voltage level.

BRIEF DESCRIPTION OF THE DRAWINGS

These and other features and advantages of the invention will be readily apparent to one of ordinary skill in the art from the following written description, read in conjunction with the drawings, in which:

FIGS. 5(a)-5(h) are waveform diagrams illustrating exemplary control signals associated with the control logic diagram shown in FIG. 4;

BEST MODE FOR CARRYING OUT THE INVENTION

In the following description, for purposes of explanation and not limitation, specific details are set forth, such as particular circuits, circuit components, control mechanisms, etc. in order to provide a thorough understanding of the present invention. However, it will be apparent to one skilled in the art that the present invention may be practiced in other embodiments that depart from these specific details. In other instances, detailed descriptions of well known methods, devices and circuits are omitted so as to not obscure the description of the present invention with unnecessary details.

Figure 1:
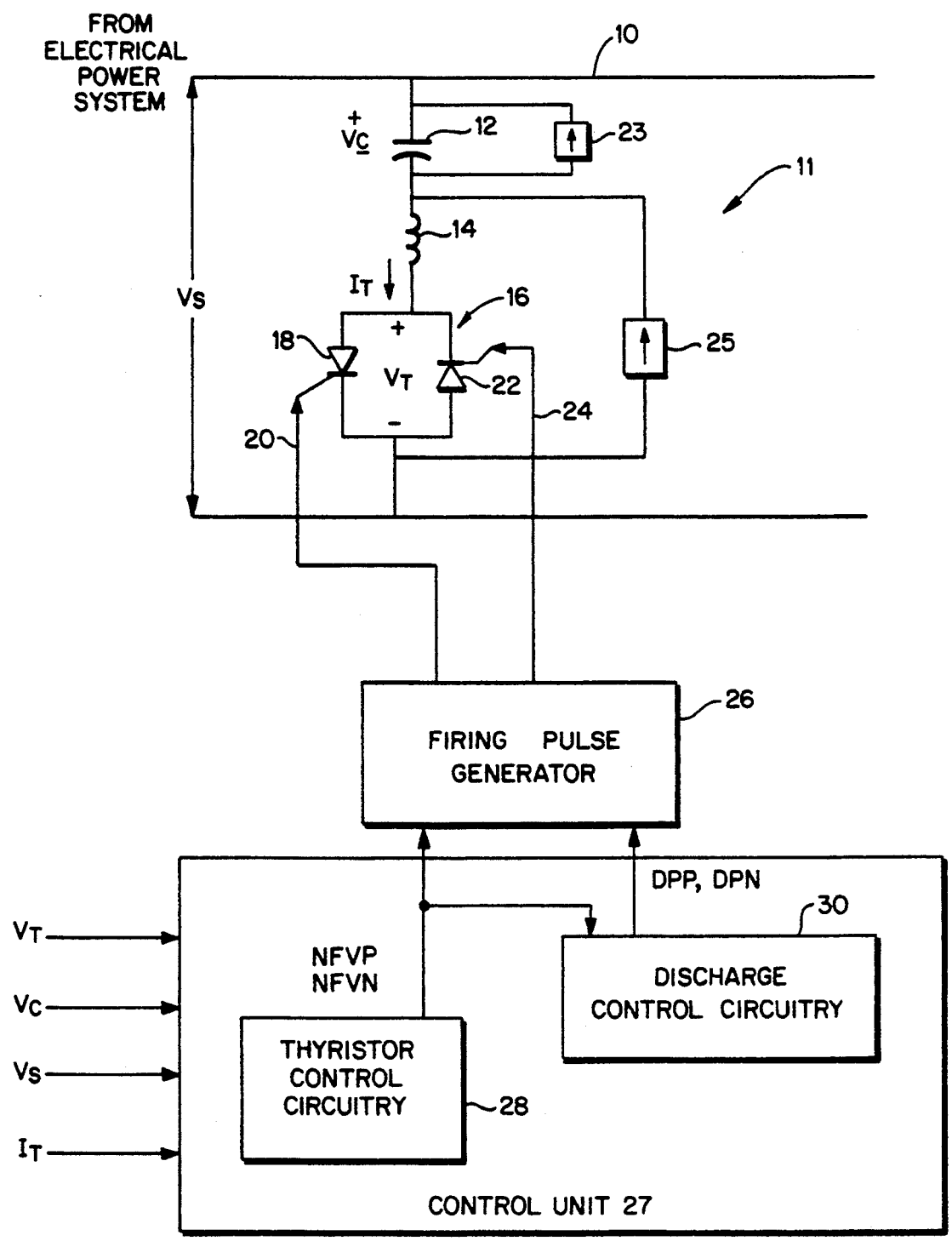
FIG. 1 is a schematic diagram showing a thyristor-switched capacitor network which may be used in accordance with the present invention.
Figure 2:
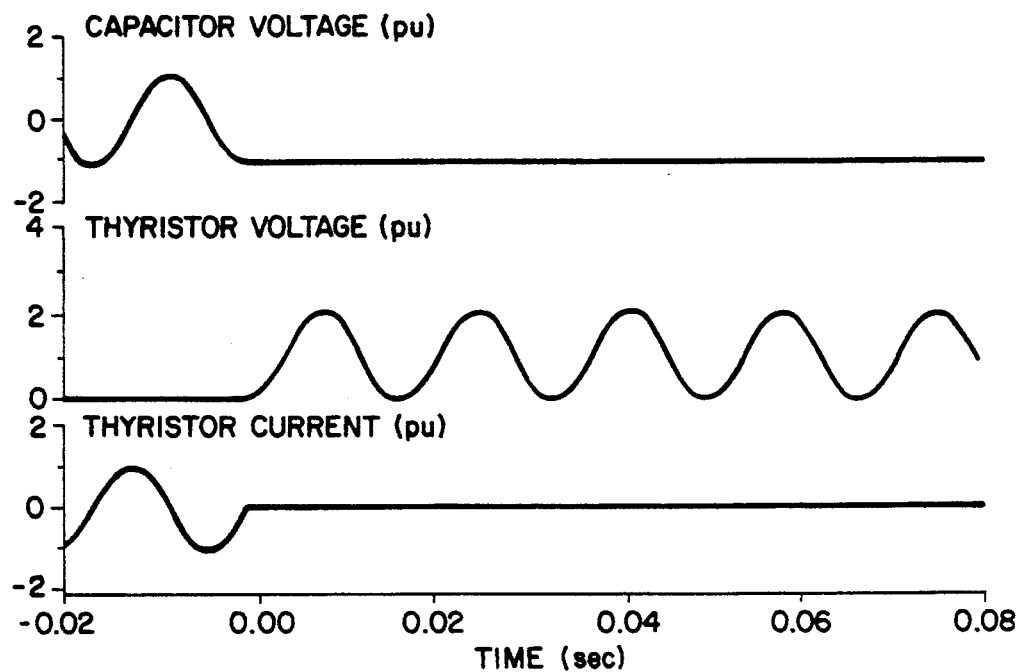
FIG. 2 is a waveform diagram of the voltage and current characterizing capacitor connect and disconnect conditions under different thyristor switching conditions.

Referring to FIG. 1, a thyristor-switched capacitor circuit indicated generally at 11 is connected across an AC transmission line 10 which provides high voltage $V_S$ power from an electrical power system not shown. Connected in series across AC transmission line 10 is capacitor 12, surge inductor 14 and thyristor switch 16 which includes antiparallel thyristors 18 and 22. Thyristors 18 and 22 are fired, i.e. activated and deactivated, by respective firing signals 20 and 24 generated by a firing pulse generator 26 of conventional design. Control signals for determining when firing signals are generated by firing pulse generator 26 are generated by thyristor control circuitry 28 and discharge control circuitry 30. Thyristor control circuitry 28 is of the conventional type, see e.g. the circuitry disclosed in U.S. Pat. No. 4,274,135 entitled "Gating Circuit for High Voltage Thyristor Strings." The details of the discharge control circuitry 30 will be described in further detail below. While shown as separate blocks, the thyristor control circuitry 28 and discharge control circuitry 30 form a single control unit 27 receiving as input signals $V_T$, $V_C$, $V_S$, and $I_T$ (some or all inputs may be used, depending upon specific implementation). Connected in shunt across capacitor 12 is a metal oxide varistor (MOV) 23. Connected in shunt across surge inductor 14 and thyristor switch 16 is MOV 25.

In operation, the thyristors 18 and 24 are fired in response to normal positive (NFVP) and negative (NFVN) firing voltage signals generated by thyristor control circuitry 28 in response to a VAR demand signals at times when capacitor voltage $V_C$ and the system voltage $V_S$ are substantially equal and the voltage across the thyristor $V_T$ is nearly zero. MOV devices 23 and 25 function to limit the voltage across capacitor 12 and thyristor switch 16, respectively, in the conventional manner. Similarly, surge inductor 14 limits the rate of change in the current through the thyristor to a tolerable level. While both the MOV devices 23 and 25 and surge inductor 14 are desirable, they are not necessary to practice the present invention.

Figure 3:
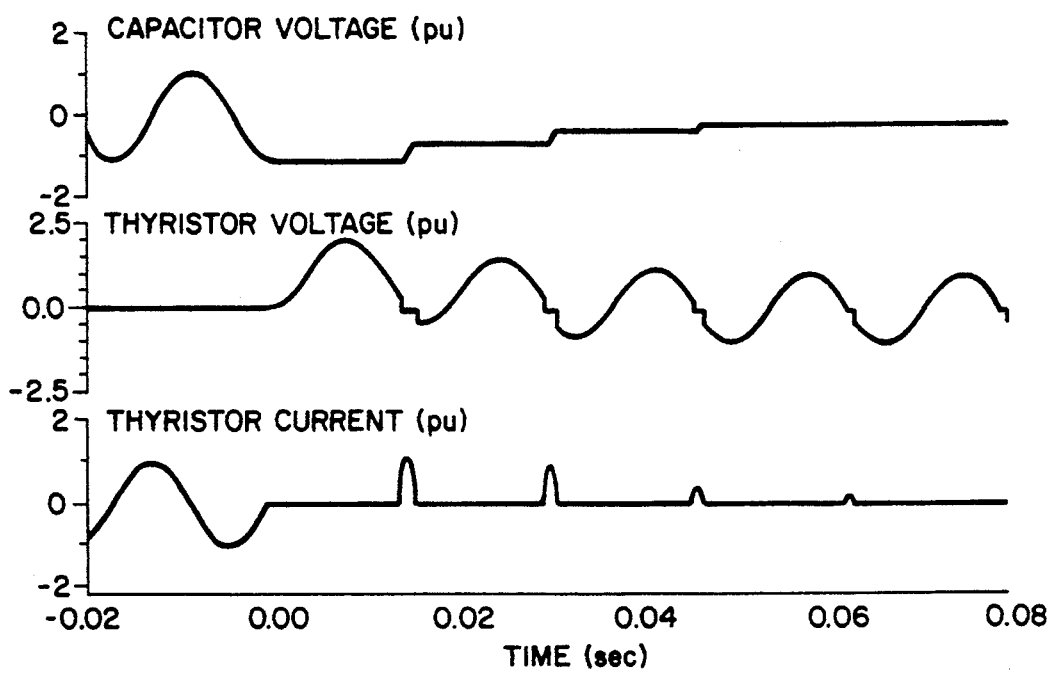
FIG. 3 is a diagram of voltage and current waveforms characterizing capacitor connect and disconnect conditions under different thyristor switching conditions in accordance with one embodiment of the present invention.

Further operation will now be described in conjunction with FIG. 3. At time −0.02 seconds, the thyristor 16 is conducting thyristor current $I_T$ which leads the capacitor voltage $V_c$ and the source voltage $V_S$ (not shown) by 90 degrees. Voltage $V_T$ across the thyristor is of course zero. At time 0.00 seconds, the demand for reactive power ceases and firing signals 20 and 24 for turning on thyristors 18 and 22 generated from thyristor control circuitry 28 and firing pulse generator 26 are removed. As a result, $I_T$ goes to zero and the capacitor 12 remains charged at the peak voltage of source voltage Vs shown as −1.0 p.u. During the first cycle after $I_T$ goes to zero, the discharge control circuitry 30 detects the source and voltage $V_S$ as well as the normal firing voltage signals NFVP and NFVN and generates firing pulse commands used by firing pulse generator 26 to briefly pulse the thyristors 18 and 22 during the second half of the first cycle of $V_T$ after t=0.0 seconds. The pulse lasts for only a short duration, e.g. a few milliseconds, to permit a small amount of current to flow from charged capacitor 12 thereby reducing the capacitor voltage $V_C$. At the same point in the next cycle, the discharge control circuitry 30 causes another brief firing pulse to be generated further discharging the capacitor 12 and reducing $V_C$. This procedure continues for continuous consecutive cycles until the capacitor 12 is fully discharged and the voltage $V_C$ is zero. In this way, the capacitor 12 is efficiently but gradually discharged without stressing the TSC components or disturbing the electrical system. Thus, the rate at which the capacitor 12 is discharged may be optimally controlled. As a result of the capacitor discharge, the ratings of the thyristor components are reduced thereby reducing costs, e.g. insulation costs, etc.

Figure 4:
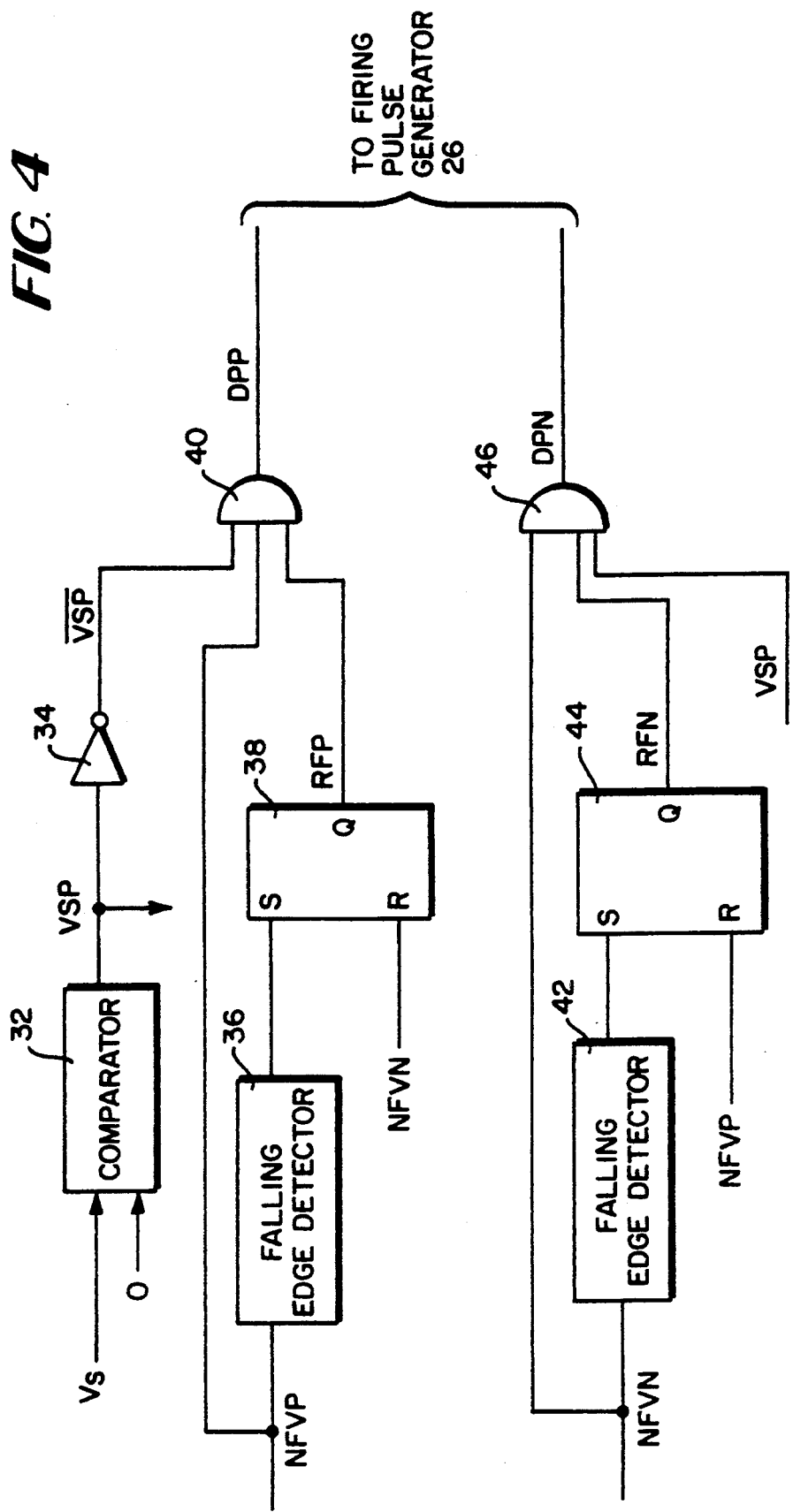
FIG. 4 is a logic block diagram showing exemplary control logic for generating thyristor firing signals for gradually discharging the capacitor in accordance with one embodiment of the present invention.

In the preferred embodiment, the discharge control circuitry 30 is constructed using discrete digital logic circuits in order to generate positive discharge pulse (DPP) and negative discharge pulse (DPN) command signals to firing pulse generator 26. Those skilled in the art will of course recognize that the functions of discharge control circuitry 30 could also be performed using other control means including, for example, an appropriately programmed digital signal processor (DSP) or microprocessor. Either mechanism may readily be programmed to implement the digital logic functions (or similar type functions) of the discharge control circuitry 30 described now in conjunction with FIGS. 4 and 5.

In principle, the logic circuits of discharge control circuitry 30 compare the polarity (either positive or negative) of the TSC voltage, i.e. $V_S$, to that of the thyristor voltage $V_T$ during predetermined time and voltage windows. In the absence of any charge stored on capacitor 12 so that capacitor voltage $V_C$ is zero, the $V_S$ and $V_T$ voltages are equal and thus transition from positive to negative at the same instant. However, if $V_C$ is other than zero indicating charge is stored on capacitor 12, the source voltage $V_S$ transitions before the thyristor voltage $V_T$, (hence $V_S$ has a different polarity than $V_T$), forward biased thyristor 18 is then pulsed to drain some of the charge stored on capacitor 12.

To generate the appropriate discharge control signals, the source voltage $V_S$ is detected by comparator 32 which determines if $V_S$ is greater than zero. If so, a binary signal labelled VSP is generated to indicate $V_S$ is positive. The signal VSP is fed to inverter 34 to generate VSP′, i.e. the opposite binary value of VSP. Of course, VSP′ goes high when VSP is low indicating that $V_S$ is currently negative. In FIG. 5(a), $V_S$ is shown as a dotted sinusoidal waveform and VSP is shown as a solid line, binarized waveform which tracks the relationship of $V_S$ to zero. FIG. 5(b) depicts the thyristor voltage waveform $V_T$ lagging the source voltage $C_S$ and charge stored on capacitor 12.

The usual firing voltage logic signals (NFVP and NFVN) generated by thyristor control circuitry 28 are received by discharge control circuitry 30. FIG. 5(d) illustrates the NFVP waveform, and FIG. 5(c) depicts the NFVN waveform. The thyristor control circuitry 28 generates the NFVP and NFVN signals as logic "ones" only when the magnitude of the thyristor voltage $V_T$ is within a "voltage window" defined between predetermined positive and negative voltage thresholds. The predetermined thresholds are shown in FIG. 5(b) along with the waveform of the thyristor voltage $V_T$ as dotted lines at 0.50 p.u. and −0.50 p.u. A falling edge detector 36 detects when positive firing logic signal NFVP falls from a binary one to a binary zero and sets a flip-flop 38. The output signal (RFP) of flip-flop 38 shown in FIG. 5(f) defines the beginning of the "time window" during which capacitor discharge occurs. The end of that time window is determined when the negative firing logic signal NFVN changes from a binary zero to a binary one which resets flip-flop 38. The output signal (RFN) of flip-flop 44 shown in FIG. 5(e) defines a similar time window.

Comparing all of FIGS. 5(a)–5(h) during the time period between 0.00 seconds and 0.02 seconds, a DPP positive discharge pulse as shown in FIG. 5(h) is generated only during the time period when the flip-flop output RFP is high, the source voltage $V_S$ is negative, and the thyristor voltage $V_T$ is between zero and the predetermined positive voltage threshold. Logic AND gate 36 detects this condition when logic variables VSP′, NFVP, and RFP are all binary ones and generates a discharge positive firing pulse (DPP) command signal shown in FIG. 5(g) as a solid line waveform to the firing pulse generator 26. The timing and voltage windows minimize switching transients. Once the capacitor 12 is discharged, the predetermined threshold voltages also prevent continual firing of the thyristor 16 at the end of the forward-voltage time period.

Similar logic operations occur with respect to NFVN falling edge detector 42, flip-flop 44, and AND gate 46 to generate a negative discharge pulse (DPN). Corresponding logic signals NFVN, RFN, and DPN are shown as dotted line waveforms in FIGS. 5(c), 5(e), and 5(g), respectively.

Figure 6A:
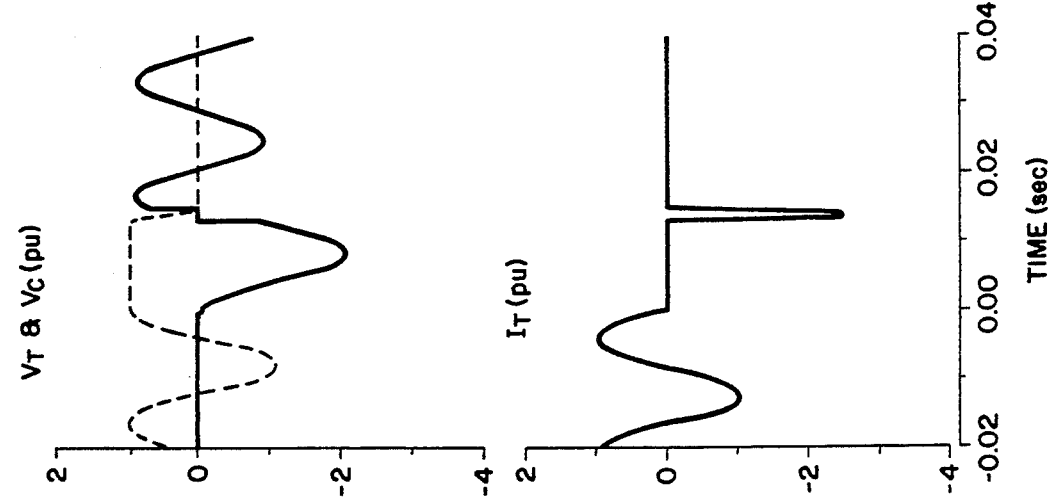
FIG. 6(a)-6(c) are waveform diagrams of the voltage and current characterizing capacitor connect and disconnect conditions using different thyristor switch times in accordance with another embodiment of the present invention.

In another embodiment of the present invention, the discharge control circuitry 30 rapidly discharges the capacitor 12 using a single pulsing of thyristor 16. Referring to FIG. 6(a) in which pulsing occurs during the negative voltage side of the threshold window, the thyristor voltage $V_T$ and the thyristor current $I_T$ are indicated as solid lines; capacitor voltage $V_c$ is indicated as a dotted line. At time 0.0 seconds, the thyristor 16 is turned off. During the first half of the first cycle of the thyristor voltage $V_T$, the thyristor is pulsed for a time period sufficient to fully discharge capacitor 12 when the magnitude of $V_T$ enters the predetermined threshold voltage window at a voltage of −1.0 p.u. As shown, the thyristor current $I_T$ is significant (over twice the per-unit value) during discharge. Thus, while this embodiment is desirable from the standpoint of almost immediately discharging the capacitor 12, it is somewhat undesirable in that the TSC components must be rated to withstand this relatively high discharge current.

Figure 6B:
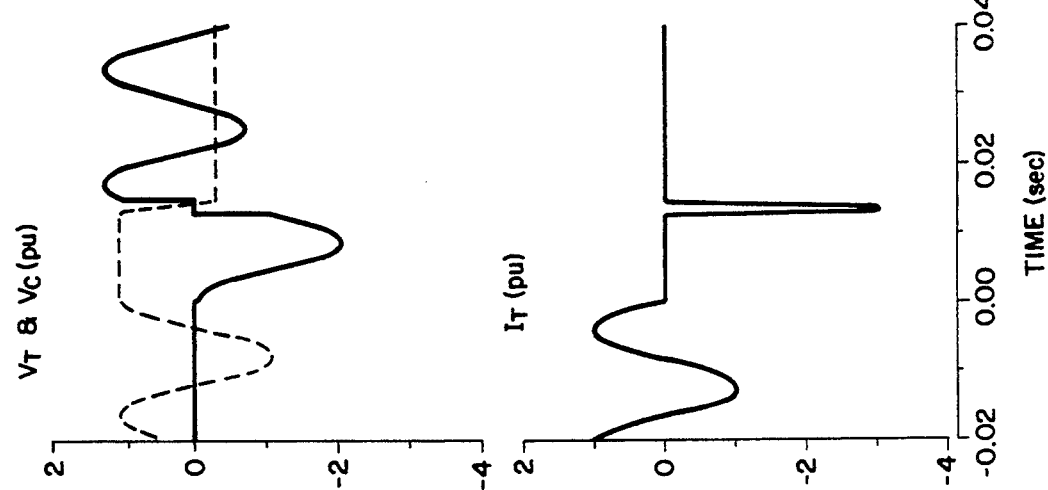
Figure 6C:
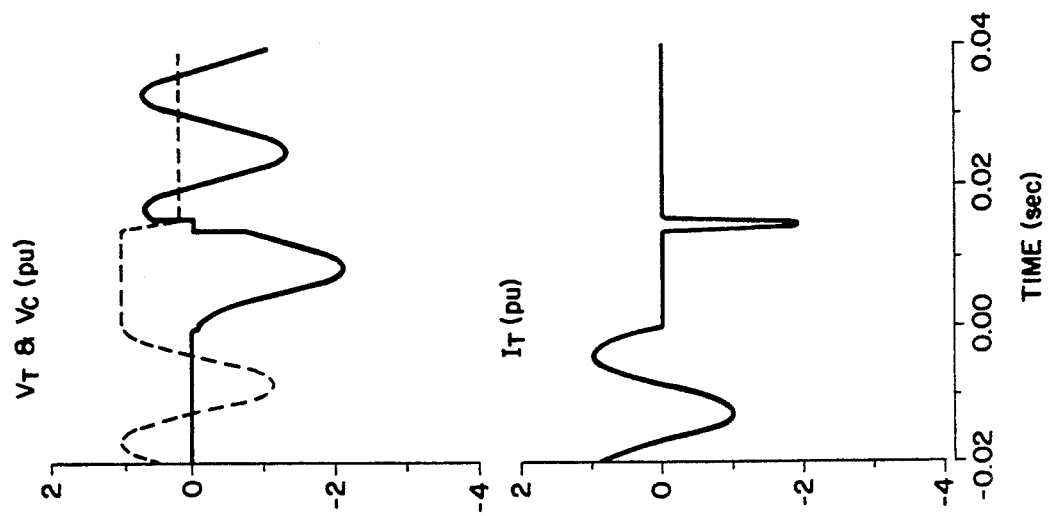

For purpose of comparison, the waveforms of FIGS. 6(b) and 6(c) illustrate the sensitivity of capacitor discharge to the thyristor firing time. Obviously, FIG. 6(a) shows the appropriate timing to achieve complete capacitor discharge. However, for example, if the thyristor 16 is fired ten degrees too soon (corresponding to a greater magnitude for the threshold), the capacitor 12 is not only discharged from a voltage 1.0 p.u., it is slightly recharged to a negative voltage. Perhaps more significantly, the discharge current reaches an undesirably high value of −3.0 p.u. If the thyristor 16 is pulsed ten degrees too late as shown in FIG. 6(c), the capacitor is only partially discharged. Thus, by controlling the magnitude of the threshold value for the voltage window, and hence the time of firing, the present invention controls the rate at which the capacitor 12 may be discharged, either rapidly or gradually depending on system needs.

Figure 7:
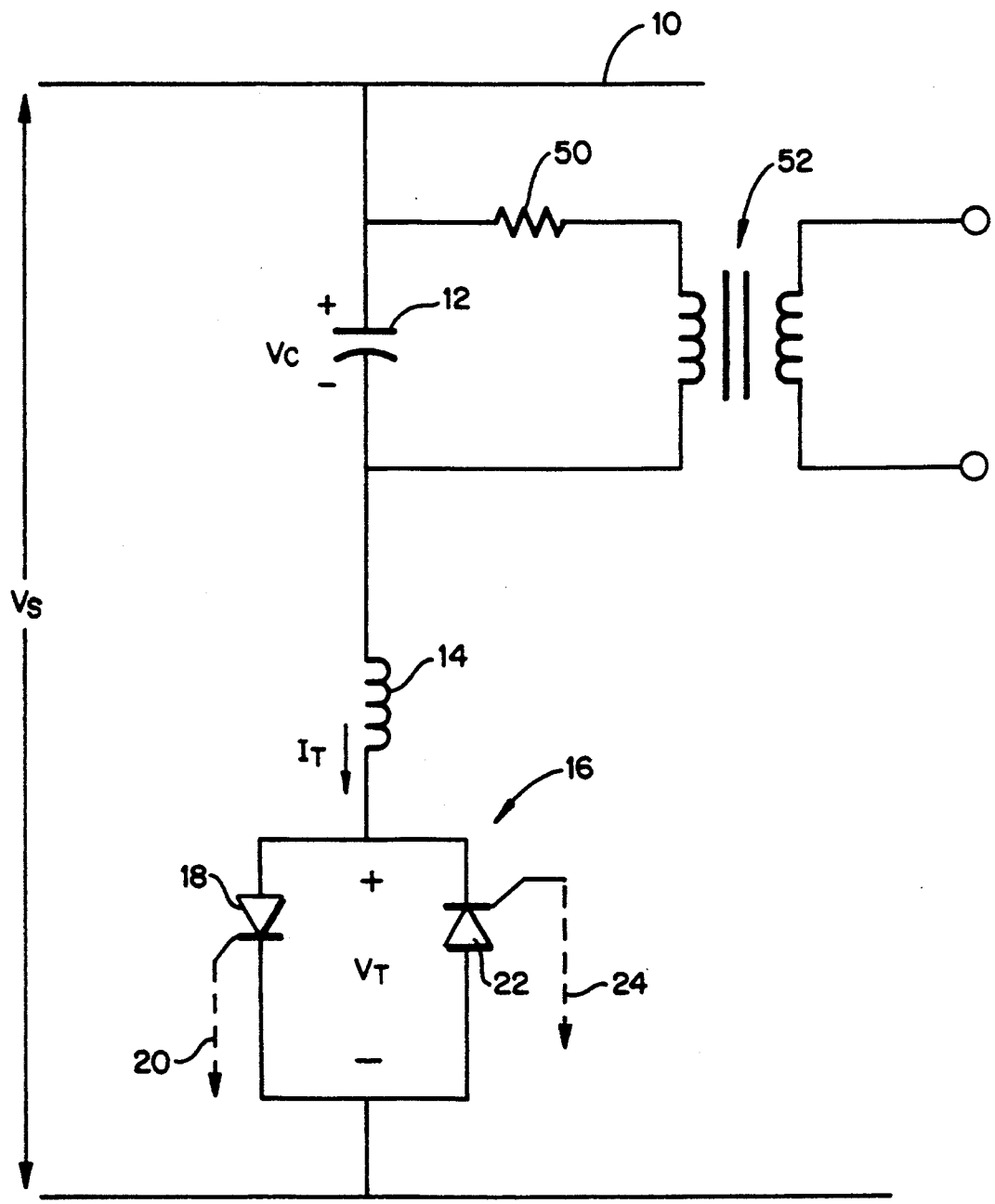
FIG. 7 is a schematic diagram of a portion of a static VAR compensator showing a thyristor-switched capacitor and a discharge circuit according to another embodiment of the present invention.

An alternative embodiment shown in FIG. 7 provides a potential transformer 52 and a resistor 50 across the capacitor 12. The secondary of transformer 52 may be left open circuited or connected to a high impedance. Although potential transformers have been used to discharge capacitors, the present invention requires that transformer 52 be capable of performing a large number of rapid discharge operations to accommodate rapid on/off sequencing of the capacitor 12 over a relatively short time period due to varying reactive demands of the external system. To accomplish this with an external element, the present invention employs resistor 50 to provide several functions: slow the capacitor discharge decay characteristic, dissipate the energy discharged from capacitor 12 outside of the potential transformer 52, limit current, and prevent any possible nonlinear interactions during turn-on of the TSC. During normal operation when AC voltage is applied across the capacitor 12, the transformer 52 essentially open circuits preventing any voltage drop across resistor 50. When thyristor 16 is switched off and a DC voltage $V_c$ appears on capacitor 12, discharge of that DC current can occur through resistor 50.

While the invention has been particularly shown and described with reference to the preferred embodiments thereof, it will be understood by those skilled in the art that the invention is not to be limited to the disclosed embodiments and is intended to cover various modifications and equivalents included within the scope of the appended claims.

What is claimed is:

1. A method of discharging a static VAR compensator connected to an AC electrical system including a capacitor connected in series between the AC electrical system and a thyristor switch of two antiparallel thyristors which are selectively controlled by external control signals comprising:
   determining whether voltage across the thyristors is within a predetermined voltage threshold range,
   firing the thyristors using one or more pulses to discharge energy stored in the capacitor, and
   returning the discharged energy to the AC electrical system.

2. A method of discharging a static VAR compensator connected to an AC electrical system including a capacitor connected in series between the AC electrical system and two antiparallel thyristors which are selectively controlled by external control signals, comprising:
   determining when the magnitude of the voltage across the thyristors is within a predetermined voltage threshold range when the thyristors are turned-off,
   applying a control pulse to activate one of the thyristors for a time period sufficient to substantially discharge the capacitor, and
   returning the discharged energy to the AC electrical system.

3. The method according to claim 2, further comprising:
   detecting the polarity of the supply voltage generated by the AC electrical system;
   comparing the polarity of the supply voltage with the polarity of the thyristor voltage;
   proceeding to the determining step (a) if the polarities of the supply and thyristor voltage differ.

4. The method according to claim 2, further comprising:
   determining if the voltage supplied to the static VAR compensator leads the voltage across the thyristor, and
   if so, proceeding to the determining step (a).

5. The method according to claim 2, further comprising:
   discharging the capacitor through a resistor and transformer connected in shunt across the capacitor.

6. A method of discharging a static VAR compensator connected to a AC electrical system including a capacitor connected in series between the AC electrical system and two anti-parallel thyristor switches which are selectively controlled by external control signals comprising the steps off
   determining when a substantially constant voltage exists across the capacitor;
   applying a periodic series of firing pulses to one of the thyristors to gradually discharge the capacitor thereby relieving stress on and minimizing ratings for the capacitor and the thyristors; and
   determining when the magnitude of the voltage across the thyristor is within a predetermined threshold range.

7. The method according to claim 4, further comprising:
   detecting the polarity of the supply voltage supplied from the AC electrical system;
   comparing the polarity of the supply voltage with the polarity of the thyristor voltage;
   proceeding to the applying step (b) if the polarities of the supply and thyristor voltages differ.

8. The method according to claim 4, further comprising:
   determining if the voltage supplied to the static VAR compensator leads the voltage across the thyristor.

9. A system for gradually discharging a static VAR compensator, comprising:
   a power transmission line for providing AC power;
   a capacitor connected to the transmission line;
   switching means for controllably switching the capacitor across the transmission line;
   a control circuit for periodically activating the switching means gradually reducing the capacitor voltage; and means for detecting when the voltage across the switching means is within a predetermined range.

10. The system according to claim 9, wherein the control circuit periodically activates the switching means when a substantially constant voltage exists across the capacitor to gradually reduce the capacitor voltage to zero.

11. The system according to claim 9, wherein the control circuit includes:
   thyristor control circuitry;
   capacitor discharge control circuitry; and means for generating firing pulses for activating the switching means to conduct current based on signals received from the thyristor control circuitry and the capacitor discharge control circuitry.

12. The system according to claim 9, further comprising:
   a first varistor connected in shunt with the capacitor, and
   a second varistor connected in shunt with the thyristor switches.

13. The system according to claim 9, further comprising:
   a surge inductor connected between the capacitor and the switching means.

14. The system according to claim 9, wherein the control circuit includes:
   means for determining if voltage supplied to the static VAR compensator leads the voltage across the switching means.

15. The system according to claim 9, wherein the control circuit includes:
   means for detecting the polarity of supply voltage supplied via the transmission line, and means for comparing the polarity of the supply voltage with the polarity of the voltage across the switching means, wherein the switching means are activated when the voltage polarities of the supply and switching means differ.

16. The system according to claim 9, wherein the predetermined range is variable and includes:
   a positive voltage and a negative voltage whose magnitudes are less than the peak value of a supply voltage, wherein the values of the positive and negative voltages determine the timing of and extent to which the capacitor voltage is reduced.

17. The system according to claim 9, wherein varying the magnitude of the predetermined range changes the rate at which the capacitor voltage is reduced.

18. The system according to claim 9, further comprising:
   means connected to the capacitor for delaying the rate at which the capacitor voltage is reduced for dissipating energy discharged by the capacitor.

19. A system for rapidly discharging a static VAR compensator, comprising:
   a power transmission line for delivering AC power;
   a capacitor connected to the transmission line;
   switching means for controllably switching the capacitor across the transmission line;
   control means for activating the switching means during a single time period when a substantially constant voltage exists across the capacitor to rapidly reduce the capacitor voltage to zero; and
   means for detecting when the voltage across the switching means is within a predetermined range.

20. The system according to claim 11, wherein the control means includes:
   thyristor control circuitry;
   capacitor discharge control circuitry; and
   means for generating firing pulses for activating the switching means to conduct current based on signals received from the thyristor control circuitry and the capacitor discharge control circuitry.

21. The system according to claim 11, further comprising:
   a first varistor connected in shunt with the capacitor, and
   a second varistor connected in shunt with the switching means.

22. The system according to claim 11, further comprising:
   a surge inductor connected between the capacitor and the switching means.

23. The system according to claim 11, wherein the control means includes:
   means for determining if voltage supplied to the static VAR compensator leads the voltage across the switching means.

24. The system according to claim 11, wherein the control means includes:
   means for detecting the polarity of supply voltage generated by the transmission line, and
   means for comparing the polarity of the supply voltage with the polarity of the voltage across the switching means, wherein the switching means are activated when the voltage polarities of the supply and switching means differ.

25. The system according to claim 11, wherein the predetermined range is variable and includes:
   a positive voltage and a negative voltage whose magnitudes are less than the peak value of a supply voltage, wherein the values of the positive and negative voltages determine the timing of and extent to which the capacitor voltage is reduced.

26. The system according to claim 11, further comprising:
   means connected to the capacitor for delaying the rate at which the capacitor voltage is reduced for dissipating energy discharged by the capacitor.

* * * * *